(12) United States Patent
Ruskin et al.

(10) Patent No.: US 8,488,211 B2
(45) Date of Patent: Jul. 16, 2013

(54) DEVICE, SYSTEM AND METHOD FOR PORTABLE DATA SCANNING AND TRANSMISSION

(76) Inventors: Colin Mark Ruskin, Thornhill (CA); Michael David Ruskin, Thornhill (CA)

( * ) Notice: Subject to any disclaimer, the term of this patent is extended or adjusted under 35 U.S.C. 154(b) by 873 days.

(21) Appl. No.: 12/513,782

(22) PCT Filed: Nov. 7, 2007

(86) PCT No.: PCT/CA2007/002101
§ 371 (c)(1),
(2), (4) Date: Dec. 24, 2009

(87) PCT Pub. No.: WO2008/055365
PCT Pub. Date: May 15, 2008

(65) Prior Publication Data
US 2010/0091341 A1    Apr. 15, 2010

Related U.S. Application Data

(60) Provisional application No. 60/864,753, filed on Nov. 7, 2006.

(51) Int. Cl.
*H04N 1/04*    (2006.01)
(52) U.S. Cl.
USPC ........... 358/474; 358/473; 358/471; 358/501; 382/318
(58) Field of Classification Search
USPC   358/474, 471, 473, 1.15, 1.16, 503; 382/313, 382/181, 317
See application file for complete search history.

(56) References Cited

U.S. PATENT DOCUMENTS

| | | | | |
|---|---|---|---|---|
| 5,278,673 A * | 1/1994 | Scapa et al. | ................... | 358/473 |
| 5,574,804 A * | 11/1996 | Olschafskie et al. | ......... | 382/313 |
| 5,635,697 A * | 6/1997 | Shellhammer et al. | .. | 235/462.11 |
| 6,292,273 B1 * | 9/2001 | Dow et al. | ..................... | 358/473 |
| 6,330,082 B1 * | 12/2001 | Oliver | .......................... | 358/473 |
| 6,388,773 B1 * | 5/2002 | Smith et al. | .................. | 358/473 |
| 6,459,506 B1 * | 10/2002 | Hu et al. | ...................... | 358/473 |
| 6,744,537 B1 * | 6/2004 | Chiba et al. | .................. | 358/473 |
| 6,891,979 B2 * | 5/2005 | Hu et al. | ...................... | 382/313 |
| 6,995,875 B2 * | 2/2006 | Dow et al. | ..................... | 358/473 |
| 7,014,374 B2 * | 3/2006 | Hamaguchi et al. | ........... | 400/62 |
| 7,133,162 B2 * | 11/2006 | Dow et al. | ..................... | 358/473 |
| 7,262,873 B1 * | 8/2007 | Rasche et al. | ............... | 358/1.15 |
| 7,362,477 B2 * | 4/2008 | Ishikawa et al. | ............. | 358/473 |
| 7,414,747 B2 * | 8/2008 | Ohta | ............................ | 358/1.15 |
| 7,495,811 B2 * | 2/2009 | Soda | ............................ | 358/474 |
| 7,532,369 B2 * | 5/2009 | Huang et al. | ................. | 358/474 |
| 7,679,792 B2 * | 3/2010 | Marshall et al. | ............. | 358/474 |
| 7,815,380 B2 * | 10/2010 | Choo | ............................ | 396/439 |
| 7,821,660 B2 * | 10/2010 | Kitada | ......................... | 358/1.15 |
| 7,907,297 B2 * | 3/2011 | Mikuni et al. | ............... | 358/1.15 |

(Continued)

*Primary Examiner* — Negussie Worku

(57) ABSTRACT

A device, system and method for portable data scanning and transmission are provided. The device is a portable appliance including resources for interoperating with a scanner to scan images of paper based documents, and a memory for storing the images without the need for a personal computer. The portable appliance is also interoperable with a mobile communication means to transfer the images to a remote computer. The portable appliance may include a computer program operable to enable processing of the images, including control routines for enabling data collection, storage and transfer to the remote computer. The invention can be implemented as an in-cab scanning system operable with existing in-cab communication systems.

21 Claims, 2 Drawing Sheets

U.S. PATENT DOCUMENTS

| | | | |
|---|---|---|---|
| 7,952,740 B2 * | 5/2011 | Ikeno et al. | 358/1.15 |
| 7,953,441 B2 * | 5/2011 | Lors | 455/557 |
| 7,982,918 B2 * | 7/2011 | Wilsher | 358/3.28 |
| 8,018,607 B2 * | 9/2011 | Nuttall et al. | 358/1.14 |

* cited by examiner

DEVICE, SYSTEM AND METHOD FOR PORTABLE DATA SCANNING AND TRANSMISSION

PRIORITY

This application claims the benefit of U.S. Provisional Patent Application No. 60/864,753 filed 7 Nov. 2006.

FIELD OF THE INVENTION

This invention relates in general to technologies for mobile data scanning and transmission, and more particularly to portable document scanners and the enabling of standard document scanners to operate in a portable manner.

BACKGROUND OF THE INVENTION

Numerous generic paper document scanners are known that are operable to capture one or more paper documents as an electronic image file, which file may be transmitted or viewed on a computer screen. Such a scanner generally requires control of its functions by a personal computer linked to the scanner, which computer is operable to initiate the scanner to create the image file, and then place the image file in a data stream for storage on a storage medium associated with the computer. There is considerable cost involved in providing a conventional personal computer for use in connection with a scanner.

There are many different types of businesses that depend on paper documents where it is desirable to capture the paper documents electronically at a remote location for transmission to, and processing at, a central location. Such businesses could benefit from the cost advantages, ease of adoption, and document-image evidentiary-acceptability in a simple manner, by having a portable scanner and transmission device available to them. Examples include bills of lading and delivery documents in the transportation business, order forms for products or services in various lines of business, application forms for insurance products or banking products and so on. For further explanation, but not in any way to limit the generality of this example, in the case of the transportation industry, billing can typically only be effected after the signed Proof of Delivery documents are received at the head office. In the case of long-distance delivery operators, the trucks and drivers may not return to the head-office for several days, therefore billing is delayed, resulting in a longer collection cycle and associated delayed cash-flow. Similar delays occur in the transportation industry as a result of the common practice that a carrier collects goods for delivery using the sender's documentation and until that paperwork is in the hands of head office, no processing can take place.

Portable scanners are known, but prior art portable scanners generally fall into one of two categories: those that require an attached computer to manage their operation and those that include limited functionality that permits the creation of the scanned image files of the documents in the field, and then require a generic, personal computer to be directly connected to them in order to control the download of the images. These portable scanners are operable to retain the image files of the documents at the remote location until such time as the scanner is returned to the central location, upon which the images files of the documents are transferred to computer systems at the central location for processing. This results in the delay mentioned above in the processing of such paper documents electronically, which decreases the benefits derived from numerous electronic systems that produce business efficiencies such as supply chain management systems, sales approval systems or processes, and the like.

The delay mentioned above in getting the documents back to the central location process generally occurs with use of the prior art portable scanners as well. This delay can have a negative impact on product/service delivery and cash flow, in numerous implementations. For example, where approval is required from a business office in relation to a paper estimate for goods or services created during the course of a sales call, the need to process the scanned image file of the sales estimate for approval purposes upon return to the business office reduces the effectiveness of the sales call. The potential customer may decide not to purchase the good or service by the time that approvals are obtained using the prior art portable scanners.

What is needed is an intelligent device that controls a portable scanner to provide a desirable level of on site scanner control and image processing without the need to attach the scanner to a personal computer. There is a need for such an intelligent device that is easy to use and inexpensive to produce, and that interoperates with a broad range of portable scanners and communication devices or communication systems.

SUMMARY OF THE INVENTION

In one aspect of the invention, a device for portable data scanning and transmission is provided, the device including an input and an output means, and a memory, characterized in that the device is connectable to a scanner device operable to scan images of paper based documents, and the device includes a control means operable to enable the device to interoperate with the scanner device and store the images to the memory.

In another aspect, the control means includes one or more drivers enabling interoperation with a variety of conventional scanners. In a still other aspect, the device is operable to interoperate with a mobile communication means enabling transfer of the images to a remote computer.

The memory is a computer usable medium, and a computer readable program code is stored on the computer useable medium, the computer readable program code defining a computer program on the device enabling processing of the images. In another aspect, the computer readable program code includes control routines for enabling data collection, storage and transfer to the remote computer.

In yet another aspect of the invention the device includes or is linked to one or more of: a compression utility operable to compress the data; a resolution optimization utility operable to optimize the resolution of the images for transfer and processing; an authentication utility for authenticating the data or user of the device; or an encryption utility for encrypting the data for transfer thereof, or for securing a transfer channel therefore.

In another aspect of the invention the mobile communication enables transfer of the images to a remote computer consisting of one or more external communication devices, and the computer readable program code includes an interface enabling connectivity between the scanning device and the one or more external communication devices. The one or more external communication devices may consist of a cell phone, a wireless handheld device or an in-cab communication system.

In another aspect of the invention, the device includes or is linked to a display to enable an operator to interact with one or more graphic user interfaces.

In a still other aspect of the invention, the device is provided such that it is operable as an in-cab device.

In another aspect of the invention, a system for portable data scanning and transmission is provided including: a portable appliance including a storage memory; and a scanner device connected to the portable appliance, the scanner device operable to scan images of paper based documents; wherein the portable appliance includes a control means operable to enable the device to interoperate with the scanner to scan the images of paper based documents, and store the images to the storage memory. The control means includes a plurality of drivers enabling interoperation of the portable appliance with a variety of conventional scanners. The portable appliance includes functionality that enables the portable appliance to link to a mobile communication means, and by operation of the mobile communication means link to a remote computer, thereby enabling transfer of the images from the portable appliance to the remote computer. The portable appliance may include a mini-computer, firmware, a computer program, and a power supply. The portable appliance may also include one or more activating means for manual activation of the functions of the portable appliance.

In another aspect of the invention, a method for portable data scanning and transmission is provided characterized by: (a) providing an appliance that is operable to enable electronic scanning of paper documents by a scanner linked to the appliance, and to create one or more image files corresponding to the paper documents; and (b) activating the appliance to initiate a communication routine whereby the appliance is operable to connect to a network-connected computer or to a mobile communication device, such that the one or more image files are transferred to a remote computer for processing thereof.

In a still other aspect of the invention, a method is provided for in-cab processing of paper documents characterized by: providing an in-cab appliance, the appliance being connectable to an in-cab scanner, and operable to control electronic scanning of paper documents by the scanner; scanning the paper documents using the scanner, and storing image files of the paper documents to the appliance; and transferring the image files to a remote computer by means of the appliance initiating a mobile communication device linked to the appliance to transfer the image files to the remote computer.

BRIEF DESCRIPTION OF THE DRAWINGS

A detailed description of one or more embodiments is provided herein below by way of example only and with reference to the following drawings, in which.

Figure 1:
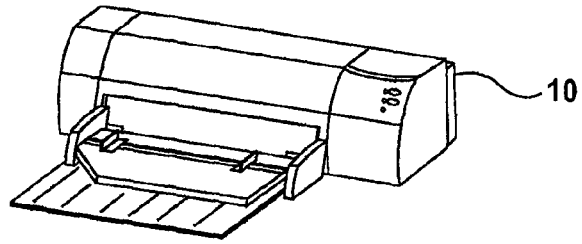
FIG. 1 illustrates a prior art scanner.

In the drawings, one or more embodiments of the present invention are illustrated by way of example. It is to be expressly understood that the description and drawings are only for the purpose of illustration and as an aid to understanding, and are not intended as a definition of the limits of the present invention.

DETAILED DESCRIPTION OF THE INVENTION

Figure 2:
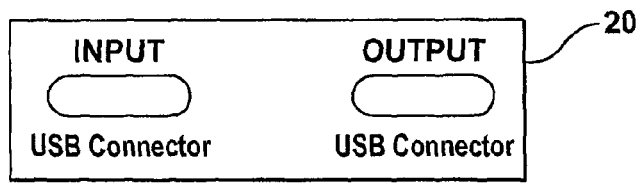
FIG. 2 consists of a representative diagram illustrating the USB connectivity of the scanner of the present invention.

FIG. 1 shows a conventional scanning device or scanner (10). It should be understood that one of the aspects of the present invention is that the conventional scanning device (10) is to be provided with an external device as represented in FIG. 2, which is best understood as a control appliance or device (20) for enabling certain function in connection with the operation of a conventional scanning device (10) as described herein. In a particular embodiment of the present invention this device (20) will appear to the scanner as though it were a personal computer providing the control signals to the conventional scanner (10), to enable the operation of the conventional scanner (10), and receiving the images derived from the scanner (10). The device (20) includes a memory (not shown) that enables the device (20) to store a plurality of scanned images until such time as it is convenient to transfer the scanned images as described below, or effect transfer in real-time as the case may be, without the need for a personal computer to be connected to the scanning device (10).

In a particular embodiment of the present invention, the device (20) includes electronic components, including a mini computer, memory, firmware, and a computer program loaded on the mini computer that provides the resources described above. The device (20) may include a power supply (either internal battery or external). However, the device (20) may rely on the external or internal power source used by the scanner (10). The device (20) also includes two or more connection sockets (as further described below). These components are generally enveloped with a housing. One or more push button switches may be provided for initiating certain functions of the device (20), thereby initiating the scanner (10).

The scanner (10) is generally powered by an external battery or an internal battery, or may be connectible to an external power source, such as a vehicle battery. The device (20), in one particular embodiment, utilizes the same power source as the scanner (10).

The device (20) is operable to interoperate with a mobile communication means (not shown). The mobile communication means may consist of either (a) a mobile communication device such as a cell phone or wireless handheld, or (b) an in-cab communication system as commonly included in long-distance trucks for example. The connection between the device (20) and the mobile communication means could be wireless, e.g., via BLUETOOTH™ or some other wireless technology. The in-cab communication systems generally include wireless communication devices such as mobile transceivers of various types including satellite based systems, often linked to Global Positioning Systems and/or vehicle tracking systems. These in-cab communication systems are generally equipped with high-availability, dedicated, secure, wireless communication systems to their base stations. PEOPLENET™ and CANCOM™ are examples of companies that build and sell existing proprietary in-cab communication systems.

Figure 3:
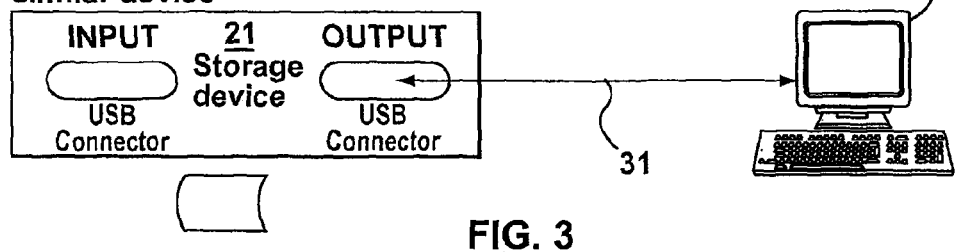
FIG. 3 consists of a system diagram illustrating the resources of the present invention, in which the portable scanner is operable to interface between the portable scanner and a remote computer.
Figure 4:
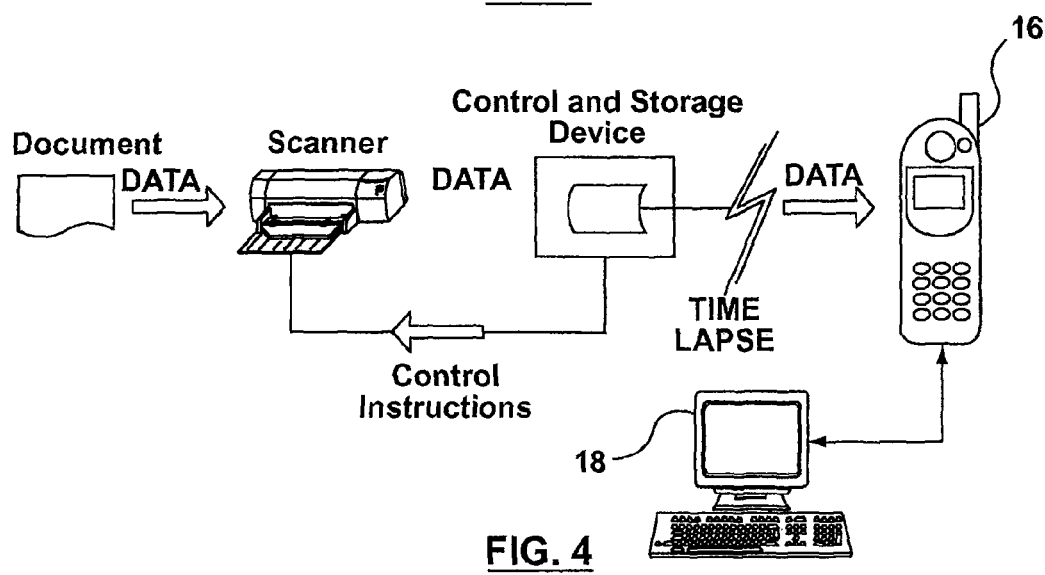
FIG. 4 consists of a system diagram illustrating the resources of the present invention, in which the portable scanner is operable to interface between the portable scanner and a mobile communication device.

In a particular embodiment of the present invention, the scanning device of the present invention includes an interface facility (not shown) to provide connectivity between the scanning device of the present invention and external devices. For example, as illustrated in FIG. 3, the interface facility includes a USB or other proprietary connection, for connection to a personal computer (14), or as illustrated in FIG. 4 for connection to a mobile communication device (16). The connection between the scanning device and the external devices could be wireless, e.g., via BLUETOOTH™ or some other wireless technology.

In a particular embodiment, the present invention also includes a communication facility (not shown), that is operable to facilitate communications between the scanning device and a remote computer (18) as shown in FIG. 4, usually by operation of the mobile communication means described above. The communication facility includes one or more communication protocols necessary to transmit data (consisting of images of paper documents) and/or possibly index information from the scanning device to the remote computer. Optionally, one of the features of the communication facility is that it is operable to translate the image data to any particular data format required, for example, for transmission via a particular communication device. The communication facility can also be linked to other facilities such as encryption facilities (to encrypt some or all data that is part of the image file), authentication facilities (for example to authenticate the identity of the person sending a document to the business office), or compression facilities (for compressing the image data to optimize transfer and use of bandwidth).

The interface facility and communication facility together are operable to provide an intelligent active interface between the scanning device and the remote computer, with the mobile communication device as an intermediary, such chat paper documents scanned by the scanning device are transferred electronically to the remote computer (18). Accordingly, the scanning device of the present invention is operable to emulate a scanner interfacing directly with a personal computer such that the scanner device is operable to capture images of paper documents, and to deliver such images to a remote computer, as though the scanner were directly connected with a personal computer for these purposes.

Figure 5:
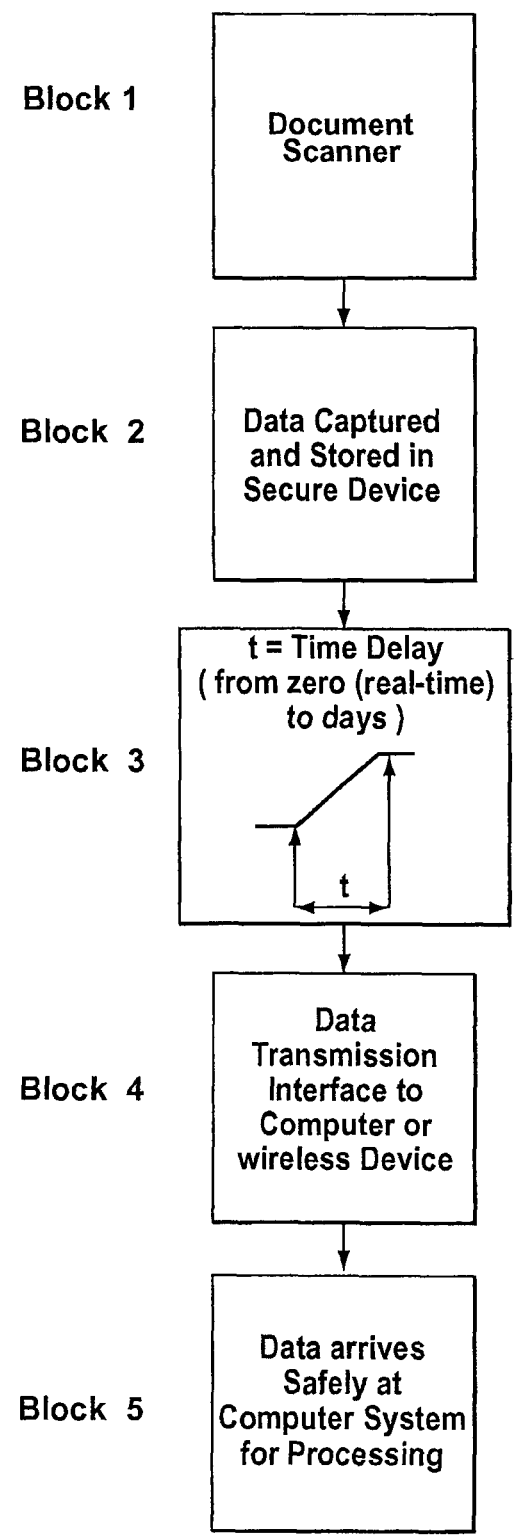
FIG. 5 is a schematic block diagram of the interface for transferring data of the device for transferring data according to the present invention.

FIG. 5 shows a block diagram that illustrates the data flow with timing for the entire process. Block 1 shows the scanner which gathers the image from a paper document and creates an electronic data stream, which is passed to Block 2 showing the device (20). Device (20) controls the scanner and stores the data passed to it by the scanner. Block 3 shows a time delay of anywhere from seconds to days during which time the data is held in the device (20) shown in Block 2. Block 4 shows the data being passed to a computer or mobile communication device.

It should be understood that the device (20) (or software embedded in the device (20)) includes the necessary drivers to control the three stages of: (i) data collection, (ii) storage and (iii) transfer to the remote computer.

The SCA would be configured to perform the functions as described hereunder. A standard generic commercially available document scanner (obtainable from any one of several manufacturers) would be connected to the SCA, which would provide the control signals to cause the scanner to perform its designed functions. (Since different scanners require variations of the same control signals, the correct matching driver software might have to be installed on the appliance.)

In an embodiment of the present invention, the device (20) includes a small display such as a liquid crystal display or similar screen to enable the operator to interact with one or more graphic user interfaces presented by the computer program loaded on the device (20) in order initiate the functions described herein. For example, the display and computer program are operable to present thumbnails of images captured or a list of files currently stored to the memory of the device (20).

As further details of implementation of the present invention, the computer program is further operable on the device (20) to: (i) provide status indicators to show the status of the processes underway; (ii) conduct housekeeping functions such as deletion of transmitted files; (iii) dynamic download of updates to the computer program such as new version of scanner drivers; and (iv) confirmation receipts and process verification.

In another particular embodiment of the present invention, the computer program of the present invention is operable to enable the remote computer (18) to control the operations of the device (20) for example for the purpose of deleting files from the device (20), obtaining additional files, or other housekeeping duties. This remote control can be provided through a number of known solutions.

In an alternate embodiment of the present invention, the device (20) of the present invention is configured to spool the data stream from the scanner and simultaneously transmit same to the remote computer (18), the device (20) acting as an intelligent and active interface between the scanner (10) and the remote computer (18).

The method is best understood as a method for capturing paper documents electronically, and transmitting the electronically captured documents to a remote computer, consisting of the steps of: (a) providing an intelligent device that is operable to control the electronic scanning of paper documents by a scanner linked to the intelligent device, to create one or more image files corresponding to the paper documents; and (b) initiating a communication routine whereby an interface facility linked to the intelligent device is operable to connect to a network-connected computer or a mobile communication device, and whereby the one or more image files are transferred to a remote computer.

The present invention will be further illustrated by reference to the following non-limiting examples.

Examples in Operation

For added clarity and not in any way to detract from the generality of the invention, and to better understand one specific application of this invention, the following examples are provided.

A truck driver (as an example of a typical user) after making a delivery would insert the signed proof of delivery documents into the scanner (10) and activate the scan. This would cause the scanner (10) to scan the document(s) and feed the images derived into the device (20). The device (20) would acquire the images, provide any and all appropriate image enhancement, if required, and store the images on the memory of the device (20). This could include labeling each with a date and time stamp as well as a pre-programmed prefix that would uniquely identify the truck/driver/route or whatever other identifier may be unique and appropriate. At a convenient time, either immediately (near real time) or later, the truck driver or other user would initiate the necessary steps (press send button or take whatever other steps are necessary) and this would cause the information temporarily stored on the memory of the device (20) to be transferred via the mobile communication means described above. The delivery documents are received by the remote computer (18) which in turn can trigger a number of processes at the office, including a notification email to the person who dispatched the delivery, initiation of payment, or triggering a dispatch system to note that the truck driver has moved to the next delivery.

An ambulance (either road or air) picks up a critically ill patient for transfer to a hospital. The patient's documentation, medication record, prescriptions, etc., (if available) could be scanned and transmitted to the hospital from the ambulance while the patient is in transit, so that all of the information is available in the emergency department in advance of the patients arrival, saving precious time and possibly helping to reduce wait times in the ER.

It should be understood that fax technology which is designed to transmit via a telephone link does not provide the advantages of the present invention. The advantage of scanning rather than faxing in this application is that scanners are designed to produce high quality images even where the source document is of an inferior quality. Fax machines generally offer no control over the quality of the image and the resolution is usually fixed or, at best, limited. Scanners can be custom set to deal with unusual types of paper and allow resolution to be set to suite special requirements. In the case of bar coded documents, the quality of a fax is generally not of high enough resolution to allow reliable reading and decoding of the bar code. In the case of OCR (Optical Character Recognition) an even higher quality image is required and it is not possible, with any degree of confidence, to apply OCR technology to a faxed document.

Other variations and modifications of the invention are possible. For example, the device of the present invention may be built into specific scanners or into the in-cab communication systems referred to above. Additional resources or features may be built into or linked to the device or the computer program loaded on the device. For example, but without limitation, certain aspects of pre-processing associated with image files (e.g., analysis of fields to identify where further information is required) can occur by operation of the device of the present invention. It should also be noted that an input means can be made part of the device or linked to the device to obtain further information from personnel in the field upon request from the remote computer. It will be appreciated by those skilled in the art that other variations of the one or more embodiments described herein are possible and may be practised without departing from the scope of the present invention.

What is claimed is:

1. A portable data scanning controller device for portable data scanning and transmission, said portable data scanning controller device comprising:
   (a) an input component operable to receive data;
   (b) a connection element operable so that said portable data scanning controller device is connectable to a scanner device that is operable to scan one or more of upto full-sized paper based documents to generate one or more images of paper based documents, said scanner device being unconnected to any personal computer;
   (c) a control element operable to cause the portable data scanning controller device to interoperate with the scanner device and achieve the transfer of the one or more images of pacer based documents to the portable scanning controller device;
   (d) a memory operable to store the one or more images of paper based documents; and
   (e) an output component operable to output data, and being operable to wirelessly transmit the one or more images to a remote computer.

2. The portable data scanning controller device of claim 1 further characterized in that the control component includes one or more drivers enabling interoperation with a variety of conventional scanners.

3. The portable data scanning controller device of claim 1 further characterized in that it is operable to: (i) interoperate with a mobile, communication device operable to transfer the one or more images to the remote; and (ii) attaching an identifier to each of the one or more images that identifies a user of the portable data scanning controller device so that such identifier is transmitted with the one or more images to the remote computer and the remote computer is operable to identify the user scanning the one or more images transmitted to the remote computer from the portable data scanning controller device in accordance with the identifier.

4. The portable data scanning controller device of claim 3 further characterized in that the memory is a computer usable medium, and a computer readable program code is stored on the computer useable medium, the computer readable program code defining a computer program on the portable data scanning controller device enabling processing of the one or more images.

5. The portable data scanning controller device of claim 4 further characterized in that the computer readable program code includes control routines for enabling data collection, storage and transfer to the remote computer.

6. The portable data scanning controller device of claim 3 further characterized in that the computer readable program code further defines on the remote computer one or more of:
   (a) a compression utility operable to compress the data;
   (b) a resolution optimization utility operable to optimize the resolution of the one or more images for transfer and processing;
   (c) an authentication utility for authenticating the data or user of the portable data scanning controller, device; or
   (d) an encryption utility for encrypting the data for transfer thereof, or for securing a transfer channel therefore.

7. The portable data scanning controller device of claim 3 further characterized in that the mobile communication device comprises one or more external communication devices, and the computer readable program code incorporates an interface operable to achieve connectivity between the portable data scanning controller device and the one or more external communication devices.

8. The portable data scanning controller device of claim 7 further characterized in that the one or more external communication devices consist of a cell phone, a wireless handheld device or an in-cab communication system.

9. The portable data scanning controller device of claim 3 further characterized in that communication between the portable data scanning controller device and the remote computer is facilitated by a communication facility.

10. The portable data scanning controller device of claim 4 further characterized in that it further comprises or is linked to a display and is thereby operable for an operator to interact with one or more graphic user interfaces.

11. The portable data scanning controller device of claim 1 wherein the portable data scanning controller device operable as an in-cab device.

12. A system for controlling portable data scanning and transmission comprising:
   (a) a scanner device operable to scan one or more upto full-sized paper based documents to generate one or more images of the scanned paper used documents, said scanner device being unconnected to any personal computer; and
   (b) a portable appliance incorporating a storage memory and a control component connectable to the scanner device and operable to interoperate with the scanner device so that the portable appliance interoperates with the scanner device to scan the one or more paper based documents and generate one or more images of the scanned one or more paper based documents, and to store the one or more images to the storage memory; and said system being operable to wirelessly link to a mobile communication device for wireless transmission of one or more of the one or more images to a remote computer.

13. The system of claim 12 further characterized in that the control component includes a plurality of drivers enabling interoperation of the portable appliance with a variety of conventional scanners.

14. The system of claim 13 further characterized in that the portable appliance includes functionality that enables the portable appliance to link to the mobile communication device, and by operation of the mobile communication device link to the remote computer, thereby enabling transfer of the one or more images from the portable appliance to the remote computer.

15. The system of claim 14 further characterized in that the portable appliance includes a mini-computer, firmware, a computer program, and a power supply.

16. The system of claim 15 further characterized in that the portable appliance includes two or more connection sockets.

17. The system of claim 15 further characterized in that the portable appliance includes one or more activating components for manual activation of the functions of the portable appliance.

18. A method for controlling portable data scanning and transmission characterized by:
(a) providing a scanner that is operable to scan one or more upto full-sized paper documents to generate one or more scanned images of the one or paper documents, said scanner device being unconnected to any personal computer;
(b) connecting to the scanner an appliance that is operable to interoperate with the scanner;
(c) the appliance interoperating with the scanner to generate one or more image files corresponding to the one or more paper documents;
(d) activating the appliance to initiate a communication routine to wirelessly connect to a network-connected computer or to a mobile communication device; and
(e) wirelessly transferring the one or more image files to a remote computer for processing.

19. The method of claim 18 further characterized in that the appliance includes a control component consisting of a plurality of drivers enabling interoperation of the appliance with a variety of scanners.

20. A method for in-cab processing of paper documents characterized by:
(a) providing an in-cab appliance, the in-cab appliance being connectable to an in-cab scanner that is unconnected to any personal computer and connecting the in-cab appliance to the in-cab scanner;
(b) scanning one or more upto full-sized paper documents using the in-cab scanner, and the in-cab appliance controlling said scanning of the one or more paper documents by the in-cab scanner and generating one or more image files of the scanned one or more paper documents;
(c) the in-cab appliance storing the one or more image files;
(d) the in-cab appliance initiating a mobile communication device wirelessly linked to the appliance to transfer one or more of the one or more image files wirelessly to a remote computer; and
(e) the in-cab appliance transferring one or more of the one or more image files to the remote computer by way of the mobile communication device.

21. The method of claim 20 further characterized in that the appliance includes a control component including a plurality of drivers enabling interoperation with a variety of conventional scanners.

* * * * *